(No Model.)
G. N. WINSLOW.
Velocipede.
No. 235,925. Patented Dec. 28, 1880.
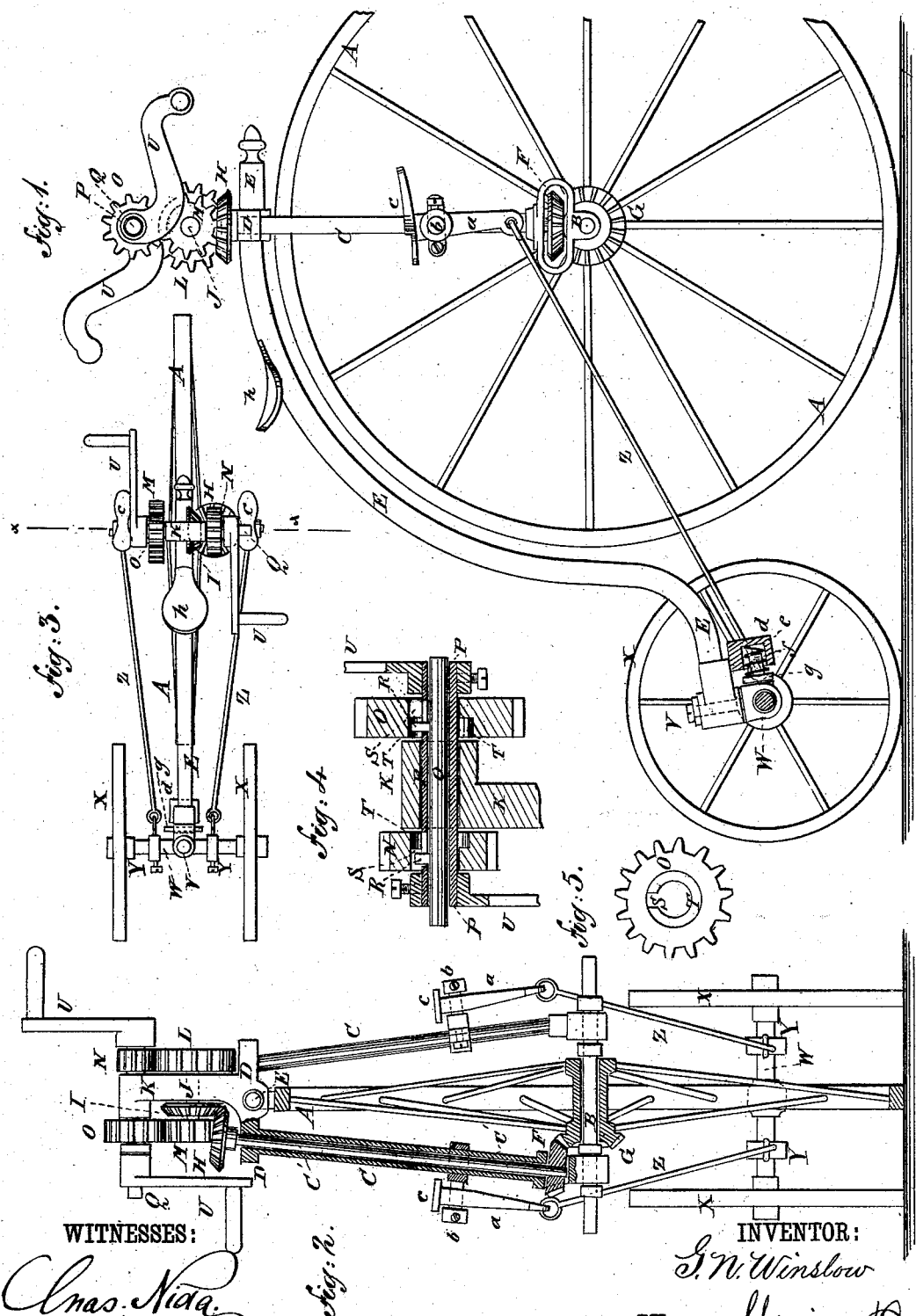
WITNESSES:
Chas. Nida
C. Sidgwick
INVENTOR:
G. N. Winslow
BY Munn & Co
ATTORNEYS.

UNITED STATES PATENT OFFICE.

GORHAM N. WINSLOW, OF BOSTON, MASSACHUSETTS, ASSIGNOR OF ONE-HALF TO JOSEPH W. WOODS, OF SAME PLACE.

VELOCIPEDE.

SPECIFICATION forming part of Letters Patent No. 235,925, dated December 28, 1880.

Application filed April 28, 1880. (No model.)

*To all whom it may concern:*

Be it known that I, GORHAM NEWTON WINSLOW, of Boston, in the county of Suffolk and State of Massachusetts, have invented a new and Improved Mechanism for Propelling and Controlling Vehicles by Hand, of which the following is a specification.

Figure 1 is a side elevation of the improvement. Fig. 2 is a front elevation, partly in section. Fig. 3 is a plan view. Fig. 4 is a sectional elevation of the crank-shaft attachments, taken through the line $x\,x$, Fig. 3. Fig. 5 is a side elevation of one of the crank-shaft gear-wheels.

Similar letters of reference indicate corresponding parts.

The object of this invention is to construct, combine, and arrange mechanism in connection with the front axle of a velocipede, as hereinafter described.

A represents the drive-wheel of a vehicle, which revolves upon an axle, B. The axle B is attached to or revolves in bearings in the lower ends of two upright bars, C, the upper ends of which are connected with a cross-head, D, attached to the forward end of the bar E. One of the uprights C is hollow, and within it is placed a rotating rod, C', its lower end revolving in the bearing connected with the axle B, and its upper end revolving in the end of the cross-head D.

To the lower end of the revolving rod C' is attached a bevel-gear wheel, F, the teeth of which mesh into the teeth of a bevel-gear wheel, G, attached to the hub of the drive-wheel A, so that the said drive-wheel A may be driven by the revolution of the said rod C'.

To the upper end of the revolving rod C' is attached a bevel-gear wheel, H, the teeth of which mesh into the teeth of the bevel-gear wheel I, attached to the short shaft J. The shaft J revolves in bearings in an upright, K, attached to or formed upon the cross-head D.

To the ends of the shaft J are attached a larger gear-wheel, L, and a smaller gear-wheel, M. The teeth of the larger and smaller gear-wheels L M mesh, respectively, into the teeth of the smaller and larger gear-wheels N O, placed upon the hollow shaft P, which revolves in bearings in the upper end of the upright K.

Within the cavity of the hollow shaft P is placed a rod, Q, to which are attached two pins, R, which pass through slots in the hollow shaft P, within the hubs of the gear-wheels N O.

In the inner surface of the hubs of the gear-wheels N O are formed slots S, to receive the pins R, so that the hollow shaft P may carry the said gear-wheels N O with it in its revolution. In the other ends of the hubs of the gear-wheels N O are formed ring-grooves or recesses T of a depth equal to the depth of the slots S, so that when the pins R are in the grooves or recesses T the revolution of the hollow shaft P will not revolve the gear-wheels N O. The pins R, slots S, and grooves T are so arranged that when a pin, R, is in the slot S of one of the gear-wheels N O the other pin R will be in the groove T of the other gear-wheel, so that only one of the gear-wheels N O will work at a time. With this construction, when the gear-wheel N is working the vehicle will be driven with increased speed, and when the gear-wheel O is working the vehicle will be driven with increased power. The gearing is adjusted to run with speed or power, as required, by sliding the rod Q longitudinally within the hollow shaft P to throw a pin, R, into gear with the desired one of the wheels N O.

To the ends of the hollow shaft B are attached the cranks U, by means of which motion is given to the drive-wheel A.

The bar E is curved downward and rearward, and to its rear end is pivoted a pin or bolt, V, attached to the axle W, upon the ends of which the wheels X revolve.

To the axle W at the inner sides of the wheels X are attached collars Y, to which are hinged the rear ends of the rods Z. The rods Z pass forward upon the opposite sides of the drive-wheel A, and their forward ends are hinged to the lower ends of the arms or levers $a$, which are pivoted near their upper ends to the ends of the axle B, or to pivots $b$ attached to the uprights C.

To the upper ends of the arms or levers $a$ are attached cross-heads or plates $c$, to receive the rider's feet, so that the rider can steer the vehicle with his feet by working the foot-levers *a c*. The pivots *b* are clamped to the uprights C, so that they can be raised and lowered, as may be required. This construction allows the foot-levers *a c* to be adjusted, as the length of the rider's legs may require.

To the lower side of the rear end of the bar E is formed, or to it is rigidly attached, a socket, *d*, to receive a spiral spring, *e*, and the guide-pin *f*, upon which the said spring *e* is placed. Upon the rear end of the guide-pin *f* is formed a cross-bar, *g*, which rests against the forward side of the axle W. With this construction, when the wheels X and axle W are turned to either side in guiding the vehicle the spring *e* and the cross-head pin *g f* will bring them back to their former position as soon as the pressure that turned them is removed.

One or more saddles, *h*, are attached to the bar E to receive one or more riders.

By attaching a side saddle to the bar E and providing the machine with a skirt-protector the machine may be ridden by a lady.

Having thus fully described my invention, I claim as new and desire to secure by Letters Patent—

1. The combination, with the front axle, B, of the hollow uprights C, cross-head D, shaft C', gears F G H I, shaft J, gears L M N O, slotted hollow shaft P, and rod Q, having pins R, said pins passing through slots and into ring-grooves of the hubs of wheels N O, as shown and described.

2. In a hand-propelled vehicle, the combination, with the bar E and the pivoted axle W, carrying the wheels X, of the socket *d*, the spiral spring *e*, and the cross-head pin *f g*, substantially as herein shown and described, whereby the wheels and axle X W are brought back after being turned to one side in guiding the vehicle, as set forth.

GORHAM N. WINSLOW.

Witnesses:
ASA WADE,
JOSEPH F. WOODS.